(12) United States Patent
Cavalieri et al.

(10) Patent No.: US 7,390,849 B2
(45) Date of Patent: Jun. 24, 2008

(54) POWDER COATING COMPOSITION

(75) Inventors: Roberto Cavalieri, Padua (IT); Sergio Gazzea, Romano d'Ezzelino (IT)

(73) Assignee: Surface Specialties Italy s.r.l. (IT)

( * ) Notice: Subject to any disclaimer, the term of this patent is extended or adjusted under 35 U.S.C. 154(b) by 540 days.

(21) Appl. No.: 10/543,548

(22) PCT Filed: Feb. 2, 2004

(86) PCT No.: PCT/EP2004/000913

§ 371 (c)(1),
(2), (4) Date: Jul. 27, 2005

(87) PCT Pub. No.: WO2004/067650

PCT Pub. Date: Aug. 12, 2004

(65) Prior Publication Data

US 2006/0100373 A1 May 11, 2006

(30) Foreign Application Priority Data

Feb. 2, 2003 (EP) .................................. 03002280

(51) Int. Cl.
*C08L 33/02* (2006.01)

(52) U.S. Cl. ................. 525/114; 525/117; 525/119; 525/170; 525/176; 525/207; 525/208

(58) Field of Classification Search ................. 525/114, 525/117, 119, 170, 176, 207, 208
See application file for complete search history.

(56) References Cited

U.S. PATENT DOCUMENTS

| | | | |
|---|---|---|---|
| 5,019,379 A | 5/1991 | Domb et al. | |
| 5,219,939 A | 6/1993 | Wamprecht et al. | |
| 5,229,458 A * | 7/1993 | Schimmel et al. | 525/108 |
| 5,484,850 A | 1/1996 | Kempter et al. | |
| 5,620,751 A | 4/1997 | Brindoepke et al. | |
| 5,639,560 A | 6/1997 | Moens et al. | |
| 6,384,102 B1 | 5/2002 | Moens et al. | |
| 6,479,585 B2 * | 11/2002 | Hart et al. | 525/119 |
| 6,541,535 B1 * | 4/2003 | Blum et al. | 522/35 |
| 6,696,522 B2 * | 2/2004 | Anderson et al. | 525/170 |
| 6,797,385 B2 * | 9/2004 | Hart et al. | 428/413 |
| 6,812,269 B2 * | 11/2004 | Koenraadt et al. | 523/336 |
| 2003/0118734 A1 * | 6/2003 | Jandel et al. | 427/372.2 |

FOREIGN PATENT DOCUMENTS

| | | |
|---|---|---|
| EP | 0 084 204 | 7/1983 |
| EP | 0 299 420 | 1/1989 |
| EP | 0 509 393 | 10/1992 |
| EP | 0 585 742 | 3/1994 |
| EP | 0 650 978 | 5/1995 |
| JP | 2000-119562 | 4/2000 |
| WO | WO-93/25596 | 12/1993 |
| WO | WO-95/16753 | 6/1995 |
| WO | WO-97/38034 | 10/1997 |
| WO | WO-02/062867 | 8/2002 |

* cited by examiner

*Primary Examiner*—Bernard Lipman
(74) *Attorney, Agent, or Firm*—Connolly Bove Lodge & Hutz LLP

(57) ABSTRACT

Resins for powder coatings which are thermally and radiation curable containing both olefinically unsaturated groups and at least one other reactive group in the same molecules selected from epoxide groups and acid groups, a method for their preparation, and the use thereof in powder coating compositions.

10 Claims, No Drawings

POWDER COATING COMPOSITION

RELATED APPLICATIONS

This application is a national stage application (under 35 U.S.C. 371) of PCT/EP2004/000913 filed Feb. 2, 2004 which claims benefit to European Patent application 03002280.0 filed Feb. 2, 2003.

The present invention relates to powder coating compositions, especially thermally and radiation curable powder coating compositions, a process for their production, and their application in powder coatings, especially for automotive topcoats.

In recent years, powder coatings have become increasingly popular in the coatings industry because these coatings are inherently low in volatile organic content, which significantly reduces emissions during the application process. Epoxy condensation polymers and acrylic resins (EP-A 0 509 393) have been used as film forming polymers for these coatings.

The use of powder coating compositions based on solid unsaturated resins which are radiation or thermally curable has been described in EP-A 0 842 204. The use of unsaturated resins prepared from acrylic polymers and radiation or thermally curable is known from U.S. Pat. No. 6,384,102. In both documents, just very few glycidyl groups are available for the curing reaction with anhydride or acid groups or by reaction among each other (homopolymerisation).

The use in powder coating compositions of solid epoxy resins based on bisphenol A and containing glycidyl groups, alone (leading to homopolymerisation) or in combination with resins containing acid or anhydride groups, optionally in the presence of catalysts is well known as state of the art.

The use in powder coating compositions of solid epoxidic cycloaliphatic hydroxyl group-containing resins, alone or in combination with acid or anhydride groups containing resins is reported in WO02/062867.

The use in powder coating compositions of solid saturated semi-crystalline polyanhydride resins in combination with resins containing glycidyl groups is known from EP-A 0 509 393.

The use of solid unsaturated semi-crystalline polyanhydrides based on unsaturated diacids is reported in U.S. Pat. No. 5,019,379.

Coatings prepared from all such systems known from the prior art suffer from poor mar resistance. Likewise, their chemical resistance needs improvement.

It is the object of the present invention to overcome these known shortcomings of the prior art.

The present invention concerns powder coating compositions which are thermally and radiation curable comprising at least one resin A having epoxy groups and at least one compound B having acid and/or acid anhydride groups, characterised in that the resin A has a specific content of epoxy groups of from 0.2 mol/kg to 3.4 mol/kg, and if compound B has acid groups, that the compound B has an acid number of from 150 mg/g to 600 mg/g, and that at least one of the components A and B contains olefinically unsaturated groups, the thermal curing being effected by reaction of the epoxy groups with the acid and/or acid anhydride groups.

One embodiment of this invention are powder coating compositions comprising at least one resin A which has both epoxy groups and olefinically unsaturated groups. This resin A which is preferably solid at room temperature, which is said of crystalline resins having a melting temperature of at least 30° C., and of amorphous resins having a glass transition temperature of at least 30° C., containing epoxide and unsaturated groups is preferably selected from the group consisting of:

a) a solid acrylic resin A1 with a glass transition temperature (measured by differential scanning calorimetry, second heat cycle, with a heating rate of 20 K/min) $T_g$ of at least 30° C., preferably at least 35° C., and particularly preferred at least 38° C., having a specific epoxy group content of 0.2 mol/kg to 3.4 mol/kg, preferably of 0.25 to 2.9 mol/kg, and particularly preferred, of 0.28 mol/kg to 2.5 mol/kg (corresponding to an "epoxy equivalent weight", molar mass divided by the number of epoxy groups per molecule, ranging from 300 g/mol to 4500 g/mol, preferably from 340 g/mol to 4000 g/mol, and particularly preferred from 400 g/mol to 3570 g/mol), and having a specific content of olefinic double bonds of 0.2 mol/kg to 3.4 mol/kg, preferably of 0.25 mol/kg to 2.9 mol/kg, and particularly preferred, of 0.28 mol/kg to 2.5 mol/kg (corresponding to an "unsaturation weight", molar mass divided by number of olefinic double bonds per molecule, ranging from 300 g/mol to 4500 g/mol, preferably from 340 g/mol to 4000 g/mol, and particularly preferred from 400 g/mol to 3570 g/mol), b) a solid cycloaliphatic hydroxyl group-containing resin A2 with a glass transition temperature determined as defined above, $T_g$ of at least 30° C., preferably at least 35° C., and particularly preferred at least 38° C., having a specific epoxy group content of 0.2 mol/kg to 3.4 mol/kg, preferably of 0.25 mol/kg to 2.9 mol/kg, and particularly preferred, of 0.28 mol/kg to 2.5 mol/kg (corresponding to an "epoxy equivalent weight", molar mass divided by the number of epoxy groups per molecule, ranging from 300 g/mol to 4500 g/mol, preferably from 340 g/mol to 4000 g/mol, and particularly preferred from 400 g/mol to 3570 g/mol), and having a specific content of olefinic double bonds of 0.2 to 3.4 mol/kg, preferably of 0.25 to 2.9 mol/kg, and particularly preferred, of 0.28 mol/kg to 2.5 mol/kg (corresponding to an "unsaturation weight", molar mass divided by number of olefinic double bonds per molecule, ranging from 300 g/mol to 4500 g/mol, preferably from 340 g/mol to 4000 g/mol, and particularly preferred from 400 g/mol to 3570 g/mol), and c) a resin A3 based on bisphenol A or phenol or cresol novolaks with a $T_g$ of at least 30° C., preferably at least 35° C., and particularly preferred at least 38° C., having a specific epoxy group content of 0.2 mol/kg to 3.4 mol/kg, preferably of 0.25 mol/kg to 2.9 mol/kg, and particularly preferred, of 0.28 mol/kg to 2.5 mol/kg (corresponding to an "epoxy equivalent weight", molar mass divided by the number of epoxy groups per molecule, ranging from 300 g/mol to 4500 g/mol, preferably from 340 g/mol to 4000 g/mol, and particularly preferred from 400 g/mol to 3570 g/mol), and preferably having a specific content of olefinic double bonds of 0.2 mol/kg to 3.4 mol/kg, preferably of 0.25 mol/kg to 2.9 mol/kg, and particularly preferred, of 0.28 mol/kg to 2.5 mol/g (corresponding to an "unsaturation weight", molar mass divided by number of olefinic double bonds per molecule, ranging from 300 g/mol to 4500 g/mol, preferably from 340 g/mol to 4000 g/mol, and particularly preferred from 400 g/mol to 3570 g/mol).

The specific epoxide group content "SEC" is defined as the ratio of the amount of substance of epoxide groups n(EP) and the mass $m_B$ of the substance (and is therefore the reciprocal of the so-called "epoxide value" or "epoxide equivalent weight"); the SI unit is "mol/kg"

$$SEC = n(EP)/m_B$$

Similarly, the specific content of olefinic double bonds is defined as the ratio of the amount of substance of olefinic double bonds n(>C=C<) and the mass $m_B$ of the substance (and is therefore the reciprocal of the so-called "unsaturation equivalent weight"); the SI unit is "mol/kg".

The solid acrylic resin A1 containing epoxide and unsaturation groups can be obtained for example by the reaction of a solid acrylic resin A11 containing glycidyl groups with an olefinically unsaturated monocarboxylic acid A12 or an olefinically unsaturated acid anhydride A13, such as acrylic, methacrylic, crotonic, or vinyl acetic acid, or half esters A14 of olefinically unsaturated dicarboxylic acids like alkyl fumarate, maleate, or tetrahydro phthalate, with alkyl groups having from 1 to 20 carbon atoms, preferably from 1 to 8, and especially preferred, from 1 to 4 carbon atoms, or acid anhydrides such as maleic or tetrahydro phthalic anhydrides. The glycidyl groups containing solid acrylic resin A11 can be prepared in the first step by polymerisation of glycidyl methacrylate and other olefinically unsaturated monomers like for example alkyl acrylate, methacrylate, maleate, or styrene with the addition of the usual thermal initiators like peroxides or azo compounds with or without a solvent or other components. At the end of the polymerisation, the glycidyl groups containing acrylic resin in the molten state is set at a temperature of 120° C. to 190° C. and optionally, an antioxidant like phosphite or sterically hindered phenol or a sterically hindered amine and/or a polymerisation inhibitor like phenothiazine or a hydroquinone derivative (hydroquinone itself or its lower alkyl ethers) are added in a quantity corresponding to a mass fraction of from 0.01% to 1% with respect to the total mass of the reactants of the second step. A catalyst of the reaction between glycidyl and acid or acid anhydride groups can optionally be added. Examples of such catalysts include amines (e.g. imidazoline), phosphines (e.g. triphenylphosphine), ammonium salts (e.g. tetrabutylammonium bromide), phosphonium salts (e.g. triphenylethylphosphonium bromide). These catalysts are preferably used in a mass fraction of from 0.05% to 1% with respect to the total mass of the reactants of the second step. Then the acid or acid anhydride group containing unsaturated monomers selected from the group of compounds A12 through A14 are slowly added to the molten resin in the second step of the reaction. The progression of the reaction is monitored for example by determination of the acid number of the resulting polymer and of the other parameters like viscosity and residual amount of epoxide groups.

The solid cycloaliphatic resin A2 containing hydroxyl, epoxide and unsaturated groups can be obtained for example by the reaction of a solid hydroxyl and epoxide groups containing cycloaliphatic resin A21 with an olefinically unsaturated monocarboxylic acid A12 or an olefinically unsaturated acid anhydride A13, such as acrylic, methacrylic, crotonic, or vinyl acetic acid, or half esters A14 of olefinically unsaturated dicarboxylic acids like alkyl fumarate, maleate, or tetrahydroplithalate, with alkyl groups having from 1 to 20 carbon atoms, preferably from 1 to 8, and especially preferred, from 1 to 4 carbon atoms, or acid anhydrides such as maleic or tetrahydrophthalic anhydrides.

The solid hydroxyl and epoxide group containing cycloaliphatic resin A21 can be prepared in the first step of the reaction by polyesterification of a first carboxylic acid A211, or a mixture of such acids, or an anhydride, or a mixture of such anhydrides, selected from tetrasubstituted tetrahydrophthalic acid or its anhydride, with the substituents R1 through R4 being chosen in each case from H and $CH_3$; a glycol A212, or a mixture of such glycols, of a general formula $X-(OH)_n$, where X is a linear or branched alkyl with from 2 to 55 carbon atoms, a linear or branched alkenyl with from 2 to 55 carbon atoms, a linear or branched alkanediyl with from 2 to 55 carbon atoms, or a cycloaliphatic residue with from 2 to 55 carbon atoms, or an aromatic radical with from 6 to 55 carbon atoms, and n is an integer between 2 and 4; and a second carboxylic acid A213 which is different from A211, or a mixture of such acids, with the formula $R-(COOH)_m$ or an anhydride thereof, or a mixture of such anhydrides, where R is a linear or branched alkyl with from 1 to 36 carbon atoms, a cycloalkane with from 5 to 36 carbon atoms, a cycloalkene with from 5 to 36 carbon atoms or an aromatic residue with from 8 to 36 carbon atoms, and m is an integer between 2 and 4; and where the amount of substance ratio between A211 and A213 varies between 100 mol/mol: :0 mol/mol and 5 mol/mol:95 mol/mol, and in which the ratio of total number of hydroxyl groups contained in A212 and the total number of carboxyl groups (anhydride groups being counted as two) in components A211 and A213 lies between 1.005 and 1.5. This polyester is then epoxidised using a peroxide compound, preferably in a solvent. Either organic or inorganic peroxides can be used as suitable peroxide compounds. Peroxycarboxylic acids such as peroxide compounds are used preferably, since monoperphthalic acid is especially preferred. Hydrogen peroxide was also found to be a preferred compound. The solvent is then removed by distillation.

At the end of the distillation step the molten resin is cooled to a temperature from 130° C. to 190° C. and optionally, an antioxidant like phosphite or sterically hindered phenol or a sterically hindered amine and/or a polymerisation inhibitor like phenothiazine or a hydroquinone derivative as defined supra are added in a quantity corresponding to a mass fraction of from 0.01% to 1% with respect to the total mass of the reactants of the second step of the reaction. A catalyst of the reaction between epoxide and acid or acid anhydride groups can optionally be added. Examples of such catalysts include amines (e.g. imidazoline), phosphines (e.g. triphenylphosphine), ammonium salts (e.g. tetrabutylammoniumbromide), phosphonium salts (e.g. triphenylethylphosphoniumbromide). These catalysts are preferably used in a mass fraction of from 0.05% to 1% with respect to the total mass of the reactants of the second step of the reaction. Then the acid or acid anhydride group containing unsaturated monomers selected from the group of compounds A12 through A14 are slowly added to the molten resin in the second step of the reaction. The progression of the reaction is monitored for example by determination of the acid number of the resulting polymer and of the other parameters like viscosity and residual amount of epoxide groups.

The resin A3 containing epoxide and unsaturated groups is preferably the result of the reaction between a epoxy-phenoxy group containing resin A31 with an olefinically unsaturated mono-carboxylic acid A12 or an olefinically unsaturated acid anhydride A13, such as acrylic, methacrylic, crotonic, or vinyl acetic acid, or half esters A14 of olefinically unsaturated dicarboxylic acids like alkyl fumarate, maleate, or tetrahydrophthalate, with alkyl groups having from 1 to 20 carbon atoms, preferably from 1 to 8, and especially preferred, from 1 to 4 carbon atoms, or acid anhydrides such as maleic or tetrahydrophthalic anhydrides. The resin A31 can be based on bisphenol A epoxy resins A311, and epoxy resins A312 based on phenol novolaks, and epoxy resins A313 based on cresol novolaks. The bisphenol A based epoxy resins A311 can be prepared in the first step of the reaction via a TAFFY process from bisphenol A and epichlorohydrin, wherein the excess of epichlorohydrin determines the number average molar mass of the epoxy resin, or in the so-called advancement process where bisphenol A is reacted with the diglycidyl ether of bisphenol A. The phenol and cresol novolaks A321 and A331 used as starting compounds can be prepared in a well-known manner by the acid-catalysed condensation of formaldehyde with either phenol or cresol, or mixtures thereof. Epoxy groups are introduced by reaction of the novolaks with epichlorohydrin. Commercially available epoxy resins, such as ®Epikote 3003 from Resolution Deutschland GmbH, ®DER 664 from DOW Chemical etc. are typical examples of epoxide group containing polyphenoxy resins A31 that can be utilised for the preparation of the unsaturation containing polyphenoxy resins A3. For the preparation of the resin A3 in the second step of the reaction, an epoxy resin selected from the group consisting of A31 through A33 is heated to a temperature of from 120° C. to 170° C., optionally an antioxidant like a phosphite or a sterically hindered phenol or a sterically hindered amine and/or a radical polymerisation inhibitor like phenothiazine or a hydroquinone derivative as defined supra can be added in a quantity corresponding to a mass fraction of from 0.01% to 1% with respect to the total mass of the reactants of the second reaction step. A catalyst of the reaction between epoxide and acid or acid anhydride groups can optionally be added. Examples of such catalysts include amines (e.g. imidazoline), phosphines (e.g. triphenylphosphine), ammonium salts (e.g. tetrabutylammonium bromide), and phosphonium salts (e.g. triphenylethylphosphonium bromide). These catalysts are preferably used in a mass fraction of from 0.05% to 1% with respect to the total mass of the reactants of the second step. Then, in the second step of the reaction, the acid or acid anhydride group containing unsaturated monomers selected from the group of compounds A12 through A14 are slowly added to the molten resin. The progression of the reaction is monitored for example by determination of the acid number of the resulting polymer and of the other parameters like viscosity and residual amount of epoxide groups.

A further embodiment of the invention are powder coating compositions which are thermally and radiation curable, comprising at least one compound B containing both olefinically unsaturated groups and acid and/or acid anhydride groups, having a melting temperature of at least 30° C., preferably of at least 40° C., and particularly preferred of at least 45° C. Preferred compounds B have an acid number or partial acid number of from 20 mg/g to 600 mg/g, preferably of from 50 mg/g to 550 mg/g, and particularly preferred from 150 mg/g to 500 mg/g, and a specific content of olefinic double bonds of 0.2 mol/kg to 3.4 mol/kg, preferably of 0.25 mol/kg to 2.9 mol/kg, and particularly preferred, of 0.28 mol/kg to 2.5 mol/kg (corresponding to an "unsaturation weight", molar mass divided by number of olefinic double bonds per molecule, ranging from 300 g/mol to 4500 g/mol, preferably from 340 g/mol to 4000 g/mol, and particularly preferred from 400 g/mol to 3570 g/mol). Preferably, B is solid and semi-crystalline, and preferably partially end capped with unsaturated groups.

The acid number is defined according to DIN EN ISO 3682 (DIN 53 402) as the ratio of the mass $m_{KOH}$ of potassium hydroxide which is needed to neutralise the sample in question, and the mass $m_B$ of the sample (or mass of solids in the sample in the case of solutions or dispersions): the customary unit is "mg/g". A partial acid number is determined in a sample containing groups that hydrolyse under formation of acid groups, by reaction of the sample with a monofunctional alcohol, and subsequent neutralisation of the half ester formed with potassium hydroxide.

A resin or compound is designated here as semi-crystalline if it has a mass fraction of at least 10% which is crystalline, i.e which exhibits a change in density upon dilatometric analysis at the crystalline melting temperature.

The compound B containing olefinically unsaturated groups and acid groups and/or acid anhydride groups, preferably both acid and anhydride groups, can be prepared for example by reaction of a solid saturated semi-crystalline compound B1 containing anhydride groups with a epoxide group-containing unsaturated monomer such as glycidyl (meth)acrylate.

The solid semi-crystalline polyanhydride compound B1 is preferably a polymeric anhydride of an aliphatic or cycloaliphatic polycarboxylic, preferably dicarboxylic, acid having a weight average molar mass of from 1000 g/mol to 5000 g/mol (measured by gel permeation chromatography using a polystyrene standard). It is also possible to use a polyol modified polymeric anhydride as described in EP-A 0 299 420 by reacting the polyanhydride with an aliphatic compound having at least two, preferably three or more, hydroxy groups per molecule. Preferred are trimethylolpropane, pentaerythritol, sorbitol, and resinous polyols such as polyester polyols, polyether polyols, polyurethane polyols, polyacrylate polyols, polycaprolactone polyol, preferably having on the average at least two, especially preferred at least 25, hydroxyl groups per molecule. The aliphatic dicarboxylic acids are preferably selected from the group consisting of malonic, succinic, glutaric, adipic, pimelic, suberic, azelaic, sebacic, and dodecanedioic acids. Particularly preferred are adipic and dodecanedioic acid. The polyanhydrides can be prepared from these acids following EP-B 0 509 393 by reacting the said acids or a mixture of the said acids with acetic anhydride. The excess of acetic anhydride is removed by heating under reduced pressure until the reaction mass is virtually free of acetic anhydride. It is also possible to modify the polyanhydrides by adding hydroxycarboxylic acids which are incorporated into the polycondensate. Such hydroxycarboxylic acids preferably have a melting temperature of between 40° C. and 150° C., such as 12-hydroxy stearic acid, 2-, 3-, or 10-hydroxy octadecanoic acid, and 2-hydroxy myristic acid.

A further embodiment of the invention is a powder coating compositions which is thermally and radiation curable, comprising at least one resin A containing epoxide and olefinically unsaturated groups, and at least one compound B containing unsaturated olefinically and acid and/or acid anhydride groups.

Powder coating compositions can be prepared by mixing A and B, and by adding the customary powder coating additives like photoinitiators, flow promoters, UV absorbers, light stabilisers, degassing agents, levelling agents, surface modifiers, pigments, fillers, or masterbatches containing one or more of the said additives, either before mixing A and B, to a single resin A, a mixture of resins A, a single compound B, a mixture of compounds B, or after mixing A and B, to mixtures of one or more of resins A with one or more of compounds B.

It is also possible, in a preferred embodiment, to add the solid, semi-crystalline polyanhydride of an aliphatic dicarboxylic acid as described in EP-A 509 393, or acrylic resins containing glycidyl groups as described in EP-A 509 393, having a number average molar mass of from 1000 g/mol to 10 000 g/mol and a glass transition temperature of from 30° C. to 90° C., being a copolymer with a mass fraction of moieties derived from glycidyl(meth)acrylate of at least 20%, to one or more of resins A, one or more of compounds B, or to mixtures of one or more of resins A with one or more of compounds B in any of the above formulations.

It is also possible, in a further preferred embodiment, to add the unsaturated and/or acrylated semi-crystalline or amorphous polyesters described, in e.g. EP-A 0 842 204, which are reaction products of glycidyl(meth)acrylate and carboxyl group-containing saturated or unsaturated polyesters having glass transition temperatures of at least 46° C., the urethane (meth)acrylates of EP-A 0 585 742, which are made by reaction of mass fractions of from 40% to 80% of an organic isocyanate having at least two isocyanate groups, from 15% to 50% of a monohydric alcohol carrying (meth)acryloyl groups, and from 2% to 20% of a further compound having at least one group which is reactive towards isocyanate, but is free from (meth)acryloyl groups, or mixtures of these polyesters and urethane(meth)acrylates, to one or more of resins A, one or more of compounds B, or to mixtures of one or more of resins A with one or more of compounds B in any of the above formulations.

The acrylic resins containing glycidyl groups can be prepared by radically initiated polymerisation of glycidyl(meth) acrylate together with other vinyl monomers such as alkyl (meth)acrylates, hydroxyalkyl(meth)acrylates, dialkyl maleates or fumarate, styrene and substituted styrenes such as p-methyl styrene or chlorostyrene, and vinyl esters like vinyl acetate or vinyl versatate. Polymerisation is initiated by azo or peroxy compounds, and may be conducted in a solvent, or in the presence of reactive diluents such as epsilon-caprolactone or glycidyl neodecanoate. In the latter case, a minimum quantity of acid monomers like (meth)acrylic acid is needed to react with the diluent under ring-opening.

The preparation and application of the powder coating compositions is made on the state of the art base and the coating is applied on the most different substrates such as i.e. paper, cardboard, wood, fibre-board, textiles, metals, plastics etc.

Surprisingly, it has been found that the application properties of coatings based on simple physical mixtures of saturated resins containing epoxide groups or acid groups and resins containing unsaturated groups are different from the properties of the coatings prepared from the resins A and/or the resins B of this invention.

The surprising effect is that the mar and chemical resistances are improved in comparison with the standard resins containing acrylic glycidyl groups combined with a polyanhydride or polycarboxylic acid. It has been found that the chemical and mar resistances are improved significantly if the powder coating composition is cured both thermally, i.e. by reaction of the epoxy and acid or acid anhydride groups, and by irradiation. Preferably, irradiation is carried out after the thermal curing step, which leads to especially smooth and defect-free surfaces. It is especially preferred to expose the coated sample to more than one, i.e. two or three, irradiation treatments. These are performed preferably in direct sequence.

The invention is further explained and illustrated by the examples which are not limiting.

Glass transition temperatures stated in these examples, as in the specification supra, were determined according to the differential scanning calorimetry method using a heating rate of 20 K/min, where the value determined during the second heating cycle is reported.

The iodine number is defined according to DIN 53 241-1 as the ratio of the mass of iodine $m_1$ which is added under discolouration to the olefinic double bonds of a sample, and the mass $m_B$ of that sample (mass of solids in the sample for solutions or dispersions); the customary unit is "g/(100 g)" or "cg/g".

EXAMPLE 1

Resin 1

Glycidyl and Unsaturated Groups Containing Acrylic Resin

A flask was charged with 900 g of pseudocumene and heated to 150° C. At this temperature a mixture of 60 g of di-tert.-butyl peroxide, 1000 g of methyl methacrylate, 1200 g of styrene and 800 g of glycidyl methacrylate were added over 8 hours. After 1 hour, 30 g of triphenylphosphite were added, and the solvent was flashed off at 160° C. under reduced pressure until a mass fraction of solids of 99.2% was reached (specific epoxy group content: 1.82 mol/kg; "epoxy equivalent weight" or "EEW": 550 g/mol). 5 g of hydroquinone monomethylether and 1 g of phenothiazine (FTZ) were added. After homogenisation of the resultant mass 200 g of methacrylic acid were added dropwise over 10 minutes. After 10 minutes the acid number was 1.0 mg/g. The temperature of 160° C. was maintained for another hour and finally the mixture was discharged. The following data were obtained:

| | |
|---|---|
| Acid number: | 0.5 mg/g |
| Viscosity at 160° C. | 8000 mPa · s |
| Glass transition temperature | 54° C. |
| specific epoxide group content | 0.93 mol/kg |
| ("EEW" | 1200 g/mol) |
| specific content of olefinic double bonds | 0.71 mol/kg |
| ("Unsaturation weight" | ca. 1400 g/mol) |

EXAMPLE 2

Resin 2

Anhydride and Unsaturated Groups Containing Polyanhydride Resin

A flask was charged with 1950 g of dodecanedioic polyanhydride and melted at 140° C. When the polyanhydride was melted, 3 g of hydroquinone monomethylether (HQMME) were added and homogenised, and over 10 minutes, 90 g of glycidyl methacrylate were added. After ten minutes no epoxy groups were detectable (specific epoxide groups content was less than 0.2 mol/kg, "EEW">5000 g/mol) and after further reaction during 1 hour at 140° C. the semi-crystalline modified polyanhydride was discharged. The following data were obtained from the product:

| | |
|---|---|
| Melting temperature | 82° C. |
| Partial acid number | 400 mg/g |
| specific content of olefinic double bonds | 0.31 mol/kg |
| ("Unsaturation weight" | ca. 3200 g/mol) |
| specific epoxide group content | <0.2 mol/kg |
| ("EEW" | not detectable (>5000 g/mol)) |

EXAMPLE 3

Resin 3

Cycloaliphatic Polyester Containing Hydroxyl, Glycidyl and Unsaturated Groups

Epoxide C of WO 02/062867 was synthesised in the following manner:

A polyester (Polyester 5 of this document) was synthesised according to the following procedure:

A reactor was charged with 760 g (5 mol) of 1,2,3,6-tetrahydrophthalic anhydride (TEPA), 813 g (4.9 mol) of terephthalic acid and 1.145 g (11 mol) of neopentylglycol and 2.8 g monobutylstannoic acid. The mixture was heated and the temperature was gradually raised to 240° C. The esterification reaction was performed by distilling the water formed until the acid number of the mixture was less than 15 mg/g.

When subjected to a slightly reduced pressure, the reaction mixture then reached an acid number of less than 5 mg/g.

The reaction mixture was filtered and 2450 g of polyester were obtained with the following characteristics:

| | |
|---|---|
| Iodine Number: | 65 cg/g |
| Acid Number: | 1.6 mg/g. |
| Viscosity at 200° C. | 3680 mPa · s |
| Hydroxyl Number | 25.6 mg/g |
| Glass Transition Temperature Tg: | 29° C. |

This polyester was then epoxidised according to the general procedure outlined in the cited document:

The polyester was dissolved in 4400 g of ethyl acetate at 50° C. Solid monoperphthalic acid (95% purity, 1245 g) was added in portions over a period of 1 h. The reaction mixture, continuously mixed, was maintained at 50° C. during this addition by immersing the reactor in cold water. The reactor was then immersed in hot water and the reaction mixture was maintained at 50° C. for further two hours when the exothermic reaction had ended.

The reaction mixture was filtered and the solid was washed with an aqueous solution of sodium carbonate and then with water after cooling to room temperature. The organic layer was concentrated by distillation under reduced pressure and dried by beating up to 220° C. at 13 hPa (13 mbar) to produce the epoxidised resin:

| | |
|---|---|
| Iodine number: | 0.03 cg/g |
| Acid Number: | 0 mg/g |
| Viscosity (cone and plate at 200° C.) | 1780 mPa · s |
| Viscosity (at 160° C.) | 12000 mPa · s |
| mass fraction of oxirane groups | 2.8% |
| specific epoxide group content | 1.75 mol/kg |
| ("EEW" | ca. 570 g/mol) |
| Hydroxyl number: | 26.5 mg/g |
| Glass transition temperature $T_g$ | 44° C. |

A flask was charged with 2000 g of this epoxy resin, and the material was melted at 170° C. At this temperature, 5 g of HQMME and 1 g of FTZ were added. After homogenisation of the resultant mass, 172 g of methacrylic acid were added drop-wise over 20 minutes. After ten minutes the acid number was 2.5 mg/g. The temperature of 170° C. was maintained for another hour and finally the resin was discharged. The following data were obtained from a sample of the resin:

| | |
|---|---|
| Acid number: | 0.5 mg/g |
| Viscosity at 160° C.: | 10600 mPa · s |
| Glass transition temperature $T_g$ | 40° C. |
| specific epoxide group content | 0.77 mol/kg |
| ("EEW" | 1300 g/mol) |
| specific content of olefinic double bonds | 1.0 mol/kg |
| ("Unsaturation weight | ca. 1000 g/mol) |

EXAMPLE 4

Resin 4

Bisphenol A Based Epoxy Resin Containing Glycidyl and Unsaturated Groups

A flask was charged with 2000 g of ®Epikote 3003 (a bisphenol A polyphenoxy resin with a specific epoxide group content of approximately 1.3 mol/kg, or "EEW" of ca. 750 g/mol) and heated to 140° C. At this temperature 10 g of HQMME, 2 g of FTZ and 2 g of triphenylethylphosphonium bromide were added.

After homogenisation of the resultant mass 72 g of acrylic acid were added drop-wise over ten minutes and 86 g of crotonic acid were successively added. After 10 minutes the acid number was 2 mg/g.

The temperature of 140° C. was maintained for another 30 minutes and finally the resin was discharged. The following data were obtained on a sample of this resin:

| | |
|---|---|
| Acid number: | 1.5 mg/g |
| Viscosity at 160° C.: | 9000 mPa · s |
| glass transition temperature $T_g$ | 48° C. |
| specific epoxide group content | 0.30 mol/kg |
| ("EEW") | 3300 g/mol) |
| specific content of olefinic double bonds | 0.91 mol/kg |
| ("Unsaturation weight") | ca. 1100 g/mol) |

Comparative Example A

Resin A

Acrylic Resin Containing Unsaturated Groups

A flask was charged with 900 g of pseudocumene and heated to 150° C. At this temperature a mixture of 60 g of di-tert.-butyl peroxide, 1500 g of methyl methacrylate, 1000 g of styrene and 500 g of glycidyl methacrylate were added over 8 hours. After 1 hour, 30 g of triphenylphosphite were added and the solvent was flashed off at 160° C. under reduced pressure until a solid content of 99.2% was reached (specific epoxide group content 1.18 mol/kg; "EEW": 850 g/mol). 5 g of HQMME and 1 g of FTZ were added. After homogenisation of the resultant mass, 275 g of crotonic acid were added over ten minutes. After further ten minutes the acid number was 2.5 mg/g. The temperature of 160° C. was maintained for another hour and finally the mixture was discharged. The following data were obtained on a sample of the resin:

| | |
|---|---|
| Acid number: | 1.7 mg/g |
| Viscosity at 200° C.: | 1530 mPa · s |
| glass transition temperature $T_g$: | 51.6° C. |
| specific epoxide group content | <0.2 mol/kg |
| ("EEW" not detectable: | >5000 g/mol) |
| specific content of olefinic double bonds | 0.91 mol/kg |
| ("Unsaturation weight") | ca. 1100 g/mol |

Preparation of Powder Coating Compositions and their Application

A series of powder coating tests were performed using the following powder coating compositions (the tables list the mass of the constituents in g, adding up in all cases to 1000 g of coating composition)

The powders of the above mentioned compositions were extruded using the following conditions:

| Twin screw extruder | |
|---|---|
| Temperatures (° C.): | 60; 100; 130 (3 heating elements) |
| Feeding ratio (%): | 10 |
| Rotation speed (rpm): | 300 |

The applications of the powder paints are done with corona gun on steel panels and curing is performed in convection oven at 140° C. for 30 minutes and/or in IR-UV oven at 0.5 mn/min (IR irradiation intensity 32 KW/m$^2$; UV: ca. 100 W/cm; distance between the lamps and the panels ca. 15 cm). The film thickness was in each case ca. 85 µm.

| REFERENCE TEST 1 | |
|---|---|
| ® Synthacryl VSC 1438 | 667 |
| DDAPA | 270 |
| ® Additol VXL 9827 | 30 |
| ® Additol 03751 | 30 |
| Benzoin | 3 |

Curing conditions: oven, 140° C. for 30 minutes

| REFERENCE TEST 2 | |
|---|---|
| Resin A | 967 |
| ® Irgacure 2959 | 10 |
| ® Irgacure 819 | 10 |
| ® Modaflow MP III | 8 |
| Benzoin | 5 |

Curing conditions: IR and UV 0.5 m/min

| REFERENCE TEST 3 | |
|---|---|
| ® Synthacryl VSC 1438 | 319 |
| DDAPA | 135 |
| ® Additol VXL 9827 | 30 |
| ® Additol 03751 | 15 |
| ® Viaktin 03546 | 487 |
| ® Irgacure 2959 | 5 |
| ® Irgacure 819 | 5 |
| Benzoin | 4 |

Curing conditions: oven 140° C. for 30 minutes, and IR and UV 0.5 m/min

| REFERENCE TEST 4 | |
|---|---|
| ® Synthacryl VSC 1438 | 319 |
| DDAPA | 135 |
| ® Additol VXL 9827 | 30 |
| ® Additol 03751 | 15 |
| Resin A | 487 |
| ® Irgacure 2959 | 5 |
| ® Irgacure 819 | 5 |
| Benzoin | 4 |

Curing conditions: oven 140° C. for 30 minutes, and IR and UV 0.5 m/min

| TEST NUMBER 1 | |
|---|---|
| Resin 1 | 671 |
| ® Viaktin 03546 | 74 |
| DDAPA | 100 |
| ® Viaktin 04058 | 100 |
| ® Additol VXL 9827 | 30 |
| Benzoin | 5 |
| ® Irgacure 2959 | 10 |
| ® Irgacure 819 | 10 |

Curing conditions: oven, 140° C. for 30 minutes

| TEST NUMBER 2 | |
|---|---|
| Resin 1 | 671 |
| ® Viaktin 03546 | 74 |
| DDAPA | 100 |
| ® Viaktin 04058 | 100 |
| ® Additol VXL 9827 | 30 |
| Benzoin | 5 |
| ® Irgacure 2959 | 10 |
| ® Irgacure 819 | 10 |

Curing conditions: IR and UV 0.5 m/minutes

| TEST NUMBER 3 | |
|---|---|
| Resin 1 | 671 |
| ® Viaktin 03546 | 74 |
| DDAPA | 100 |
| ® Viaktin 04058 | 100 |
| ® Additol VXL 9827 | 30 |
| Benzoin | 5 |
| ® Irgacure 2959 | 10 |
| ® Irgacure 819 | 10 |

Curing conditions: oven, 140° C. for 30 minutes; and IR and UV 0.5 m/min

| TEST NUMBER 4 | |
|---|---|
| Resin 1 | 592 |
| ® Viaktin 03546 | 253 |
| DDAPA | 100 |
| ® Additol VXL 9827 | 30 |
| Benzoin | 5 |
| ® Irgacure 2959 | 10 |
| ® Irgacure 819 | 10 |

Curing conditions: oven, 140° C. for 30 minutes; and IR and UV 0.5 m/min

| TEST NUMBER 5 | |
|---|---|
| Resin 1 | 592 |
| ® Viaktin 03546 | 253 |
| Dodecanedicarboxylic acid | 100 |
| ® Additol VXL 9827 | 30 |
| Benzoin | 5 |
| ® Irgacure 2959 | 10 |
| ® Irgacure 819 | 10 |

Curing conditions: oven, 140° C. for 30 minutes; and IR and UV 0.5 m/min

| TEST NUMBER 6 | |
|---|---|
| Resin 1 | 845 |
| ® Additol VXL 9890 | 100 |
| ® Additol VXL 9827 | 30 |
| Benzoin | 5 |
| ® Irgacure 2959 | 10 |
| ® Irgacure 819 | 10 |

Curing conditions: oven 140° C. for 30 minutes; and IR and UV 0.5 m/min

| TEST NUMBER 7 | |
|---|---|
| Resin 1 | 647 |
| Resin 2 | 300 |
| ® Additol VXL 9827 | 30 |
| Benzoin | 3 |
| ® Irgacure 2959 | 10 |
| ® Irgacure 819 | 10 |

Curing conditions: oven 140° C. for 30 minutes; and IR and UV 0.5 m/min, 3 times

| TEST NUMBER 8 | |
|---|---|
| Resin 1 | 845 |
| DDAPA | 100 |
| ® Additol VXL 9827 | 30 |
| ® Irgacure 2959 | 10 |
| ® Irgacure 819 | 10 |
| Benzoin | 5 |

Curing conditions: oven 140° C. for 30 minutes; and IR and UV 0.5 m/min, 3 times

| TEST NUMBER 9 | |
|---|---|
| ® Synthacryl VSC 1438 | 607 |
| Resin 2 | 340 |
| ® Additol VXL 9827 | 30 |
| Benzoin | 3 |
| ® Irgacure 2959 | 10 |
| ® Irgacure 819 | 10 |

Curing conditions: oven 140° C. for 30 minutes; and IR and UV 0.5 m/min, 3 times

| TEST NUMBER 10 | |
|---|---|
| Resin 3 | 647 |
| Resin 2 | 300 |
| ® Additol VXL 9827 | 30 |
| Benzoin | 3 |
| ® Irgacure 2959 | 10 |
| ® Irgacure 819 | 10 |

Curing conditions: oven 140° C. for 30 minutes; and IR and UV 0.5 m/min, 3 times

| TEST NUMBER 11 | |
|---|---|
| Resin 4 | 647 |
| DDAPA | 300 |
| ® Additol VXL 9827 | 30 |
| Benzoin | 3 |
| ® Irgacure 2959 | 10 |
| ® Irgacure 819 | 10 |

Curing conditions: oven 140° C. for 30 minutes; and IR and UV 0.5 m/min, 3 times

| TEST NUMBER 12 | |
|---|---|
| Resin 1 | 497 |
| Resin 2 | 230 |
| ® Additol VXL 9827 | 50 |
| ® Irgacure 2959 | 10 |
| ® Irgacure 819 | 10 |
| Benzoin | 3 |
| ® Kronos 2160 | 200 |

Curing conditions: oven 140° C. for 30 minutes; IR and UV 0.5 m/min, 3 times

®Viaktin, ®Additol, ®Modaflow and ®Synthacryl are Solutia registered trademarks.
®Viaktin 03546 is a urethane methacrylate resin,
®Viaktin 04058 is a acrylated polyester resin,
DDAPA is a polyanhydride of dodecanedioic acid
®Additol VXL 9827 is a flow-promoter masterbatch
®Additol VXL 9890 is a curing catalyst masterbatch
®Additol 03751 is a UV-stabiliser mixture
®Modaflow MP III is a silica supported flow-promoter
®Synthacryl VSC 1438 is a glycidyl acrylic resin
®Kronos 2160 is a trademark registered by NL Chemicals and corresponds to a form of titanium dioxide
Irgacure 819 and 2959 are trademarks registered by Ciba Specialties and correspond to photoinitiators for UV curing In the following table, the results obtained are listed:

| | Chemical resistance[1] | Mechanical properties[2] | Mar resistance[3] | Solvent resistance[4] |
|---|---|---|---|---|
| Reference Test 1 | 3 | 1 | 3 | 2 |
| Reference Test 2 | 2 | 4 | 2 | 5 |
| Reference Test 3 | 5 | 5 | 5 | 1 |
| Reference Test 4 | 4 | 5 | 4 | 1 |
| Test number 1 | 3 | 3 | 3 | 3 |
| Test number 2 | 3 | 4 | 3 | 3 |
| Test number 3 | 1 | 2 | 1 | 1 |
| Test number 4 | 1 | 4 | 5 | 1 |
| Test number 5 | 1 | 4 | 4 | 1 |
| Test number 6 | 1 | 4 | 4 | 1 |
| Test number 7 | 1 | 1 | 2 | 1 |
| Test number 8 | 2 | 2 | 2 | 1 |
| Test number 9 | 3 | 1 | 2 | 1 |
| Test number 10 | 2 | 2 | 1 | 2 |
| Test number 11 | 2 | 1 | 1 | 1 |
| Test number 12 | 2 | 3 | 3 | 2 |

[1]Chemical resistance: panels were heated to 65° C., a 50 µl drop of aqueous $H_2SO_4$ (36 g of acid in 100 ml of solution) was applied after every minute for 30 minutes and then the panels were visually inspected for signs of etch. Test panels were rated visually on a scale 1 to 5 (see explanation infra)
[2]Mechanical resistance: according to ASTM D 2795, same rating
[3]Mar resistance: the effect of a car wash unit was simulated by brushing with water containing sand. Visual rating
[4]Acetone double rub test according to ASTM D 5402
Evaluation; 1: excellent, 2: good, 3: sufficient, 4: poor, 5: total destruction of coating layer The combination of two kinds of functionalities, unsaturation and acid or epoxy groups, in the same resin leads to superior properties when compared to a mixture of two resins having only one functionality each which is different from the functionality of the other.

Thus, a mixture of an epoxy functional resin and an unsaturated resin as binder (see reference test 3 and 4) leads to poor performance of the coating when compared to a coating prepared with a binder having both functionalities in the same resin.

The powder coating compositions prepared with the powder coating resin compositions according to this invention are not only solid, but if compared with the only radiation or only thermally cured, see test number 1 and 2, in comparison to test number 3 radiation and thermally cured, are better in all the performances.

And if compared with mixture of unsaturated resin with glycidyl containing resins show improved mechanical and mar resistance see reference tests 3 and 4 in comparison to test number 8.

While satisfactory results can be achieved in dual cure with mixtures of resins of different functionalities with regard to solvent resistance (see reference test 3 and 4), chemical resistance, mechanical properties and mar resistance are poor in these cases. Quite surprisingly, chemical resistance is markedly improved while retaining the favourable solvent resistance results if both functionalities are combined in the same molecule. A further improvement is possible especially with regard to the mechanical and mar resistance when the irradiation step in the dual cure is repeated, cf. tests 7 through 12.

That is a really surprising result, and because of the excellent and balanced properties in all of the four performance fields, the coating compositions prepared in accordance with the present invention can be advantageously used especially for automotive coating applications.

The invention claimed is:

1. Powder coating compositions which are thermally and radiation curable comprising at least one resin A having epoxy groups and at least one compound B having acid and/or acid anhydride groups, characterised in that the resin A has a specific content of epoxy groups of from 0.2 mol/kg to 3.4 mol/kg, and if compound B has acid groups, that the compound B has an acid number of from 150 mg/g to 600 mg/g, and that at least one of the components A and B contains olefinically unsaturated groups, the thermal curing being effected by reaction of the epoxy groups with the acid and/or acid anhydride groups.

2. The powder coating compositions of claim 1 in which the resin A has olefinically unsaturated groups and epoxide groups.

3. The powder coating compositions of claim 1 in which the compound B is a resin having olefinically unsaturated groups and acid and/or acid anhydride groups.

4. The powder coating compositions of claim 2 characterised in that the resin A is a solid acrylic resin A1 with a glass transition temperature $T_g$ measured by differential scanning calorimetry, second heating cycle, with a heating rate of 20 K/min, of at least 35° C., and a specific content of olefinic double bonds of 0.2 to 3.4 mol/kg.

5. The powder coating compositions of claim 2 characterised in that the resin A is a solid cycloaliphatic hydroxyl group-containing resin A2 with a glass transition temperature $T_g$ of at least 30° C., and a specific content of olefinic double bonds of 0.2 to 3.4 mol/kg.

6. The powder coating compositions of claim 2 characterised in that the resin A is a resin A3 based on bisphenol A or phenol or cresol novolacs with a glass transition temperature $T_g$ of at least 30° C., and a specific content of olefinic double bonds of 0.2 to 3.4 mol/kg.

7. The powder coating compositions of claim 3 characterised in that the compound B is a solid polyanhydride resin with a melting temperature of at least 45° C. and a partial acid number of between 150 mg/g and 600 mg/g and a specific content of olefinic double bonds of from 0.2 to 3.4 mol/kg.

8. The powder coating compositions of claim 1 wherein both resins A and compounds B contain olefinically unsaturated groups.

9. The powder coatings compositions of claim 1 which additionally comprise one or more of a semi-crystalline or amorphous unsaturated polyester, a polyanhydride of an aliphatic dicarboxylic acid, acrylic resins containing glycidyl groups, and urethane(meth)acrylates.

10. Coatings prepared from the powder coating compositions of claim 1 by application of the powder coating compositions to a substrate and curing both thermally and by irradiation.

* * * * *